United States Patent [19]

Beuchée et al.

[11] 4,028,606
[45] June 7, 1977

[54] CONTROL CIRCUIT FOR A SWITCHED-MODE POWER SUPPLY, PARTICULARLY FOR A TELEVISION RECEIVER

[75] Inventors: Daniel Beuchée, Paris; Alain Leclair, Poissy, both of France

[73] Assignee: U.S. Philips Corporation, Briarcliff Manor, N.Y.

[22] Filed: Dec. 10, 1975

[21] Appl. No.: 639,277

[30] Foreign Application Priority Data

Dec. 20, 1974 France .............................. 74.42250

[52] U.S. Cl. .................................. 321/2; 315/399; 323/17; 358/190
[51] Int. Cl.² ....................................... H02M 3/335
[58] Field of Search ......... 321/2, 44; 323/17, 22 T, 323/23, 25, DIG. 1; 178/7.3 R, DIG. 11; 315/399

[56] References Cited

UNITED STATES PATENTS

| 3,376,489 | 4/1968 | Crayton | 321/2 |
| 3,742,330 | 6/1973 | Hodges et al. | 323/DIG. 1 |
| 3,925,716 | 12/1975 | Griffey | 321/2 |
| 3,943,425 | 3/1976 | Kupka et al. | 321/2 |

*Primary Examiner*—Gerald Goldberg
*Attorney, Agent, or Firm*—Frank R. Trifari; Henry I. Steckler

[57] ABSTRACT

A switched-mode power supply provided with a control stage and a switching stage coupled by means of a transformer. The collector of an additional transistor is connected to the transformer. In this manner the ratio of the collector current to the base current of the switching transistor can assume a predetermined value, for example a constant value whatever the value of the mains voltage applied to the power supply.

8 Claims, 3 Drawing Figures

CONTROL CIRCUIT FOR A SWITCHED-MODE POWER SUPPLY, PARTICULARLY FOR A TELEVISION RECEIVER

The present invention relates to a control circuit for a switched-mode power supply, particularly in a television receiver, said power supply comprising a rectified, non-regulated rectified DC voltage source, a driver transistor whose collector-emitter path is arranged in series with a primary winding of a first transformer, a secondary winding of the latter being coupled to the base of a switching transistor which is arranged in series with a primary winding of a second transformer having a plurality of secondary windings.

This type of switched-mode power supply is used more and more because of the numerous advantages it presents as regards energy efficiency, reliability, compactness, etc. However, as for the majority of the other types of power supplies, its operation on mains supplies of different voltages imposes the use of either a transformer with taps or switch-over from full wave rectification at the highest mains voltage to a voltage doubler rectification for the lowest mains voltage.

It is known that the specific qualities of a switched-mode power supply depend for a large part on the switching speed of the switching transistor at the moment at which the latter passes periodically from the conductive state to the blocking state; this speed is at its maximum when the switching transistor presents, at the turn-off moment, a certain ratio between the collector current and the base current IC/IB: if this ratio is too low, the delay in the recombination of the charges stored in the base increases the switching time; if it is too high there is the risk that the transistor is brought out of saturation before it is blocked, which results in its substantially immediate destruction. For the known switched-mode power supplies it is not possible to maintain a suitable IC/IB ratio in the presence of large variations of the non-regulated rectified DC voltage which result from the connection to the nominal mains voltages of, for example, 110 or 220 V; actually, if the variations in IB are substantially proportional to the variations in the non-regulated voltage, the same does not happen for those of the IC whose amplitude is less.

However, the importance of having a power supply which can operate without any switching on mains supplies of 110 or 220 V is evident: for the manufacturer it is cheaper to produce and the reliability is increased; while the user does not run the risk of incorrect manipulations, particularly when the power supply is destined for use in portable television sets.

One of the objects of the invention is to realize a control circuit which permits the switched-mode power supply to operate without switching in conditions which are substantially optimum and in the presence of mains voltage variations in the range of 90 to 250 Volts.

A further object of the invention is to ensure that said IC/IB ratio of the switching transistor has a predetermined and, more particularly a constant value at the turn-off moment whatever the value of the mains voltage applied to the power supply.

The control circuit according to the invention is characterized in that the end of the primary winding of the first transformer not connected to the driver transistor is connected to the collector of an additional transistor whose emitter is coupled with the non-regulated direct voltage source. Advantageously it is characterized in that the emitter of the additional transistor is connected to one end of a resistor, the other end of this resistor being connected to a constant current source, and that the constant current source is constituted by a second additional transistor, the two additional transistors being of complementary conductivity and their emitters being connected with each other through a resistor, whilst the collector of the second additional transistor is connected to one of the poles of the non-regulated rectified direct voltage source and the collector of the first additional transistor is connected to the end of the primary winding of the first transformer not connected to the driver transistor.

Whilst combining the action of a ballast transistor with that of a variable current generator, the circuit according to the invention thus maintains automatically a desired IC/IB ratio of the switching transistor whatever the value of the mains voltage applied to the power supply.

The description which follows hereinafter with reference to the accompanying drawings will fully explain how the invention may be realized.

Figure 1:
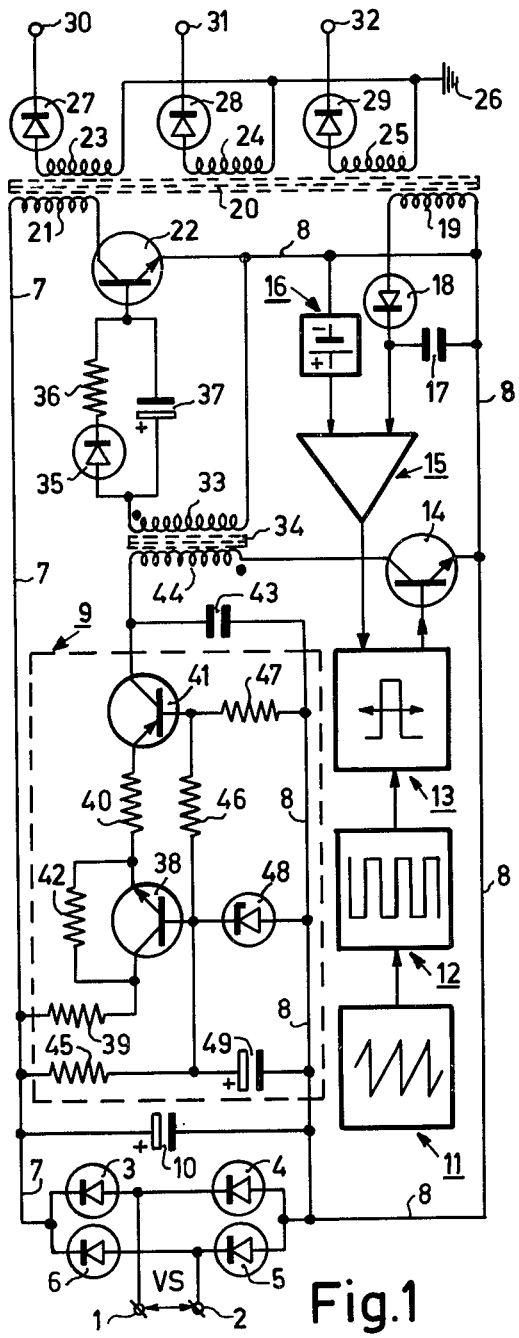
FIG. 1 shows the circuit diagram, partly as block diagram, of a switched-mode power supply for television equipped with the control circuit according to the invention.

In FIG. 1 the terminals 1 and 2 of the mains supply are connected to a rectifier cell comprising four diodes 3, 4, 5 and 6 which are mounted as a bridge. The interconnected cathodes of the diodes 3 and 6 and the interconnected anodes of the diodes 4 and 5 are connected to a positive conductor 7 and a negative conductor 8 of the switched-mode power supply and of the control circuit 9 according to the invention respectively, an electrochemical smoothing capacitor 10 being arranged at the other side between the said two conductors.

The output of a saw-tooth oscillator circuit 11 is connected to the input of a pulse shaping circuit 12, the latter being connected to one of the inputs of a pulse duration modulation circuit 13, whose output is connected to the base of a driver transistor 14 of the NPN type whose emitter is connected to the negative conductor 8.

The output of a comparator 15 is connected to the other input of the modulator 13 whilst a reference voltage source 16 is arranged between one of the inputs of the comparator 15 and the negative conductor 8. The other input of the comparator 15, which is connected to the negative conductor 8 through a capacitor 17, is connected to the cathode of a rectifier diode 18 whose anode is connected to an end of a secondary winding 19 of a transformer 20, the other end of said winding being connected to the negative conductor 8.

An end of a primary winding 21 of transformer 20 is connected to the positive conductor 7, the other end being connected to the collector of a switching transistor 22 whose emitter is connected to the negative conductor 8. One of the ends of three other secondary windings 23, 24 and 25 of transformer 20 is connected to a common earth 26, the other ends being connected to the anode of three rectifier diodes 27, 28 and 29 respectively whose cathodes are connected to three positive output terminals 30, 31 and 32.

The base of transistor 22 is coupled via a network to one of the ends of a secondary winding 33 of a transformer 34 whose other end is connected to the negative conductor 8, whilst said network comprises a diode 35 connected in series with a resistor 36, the whole being shunted by an electrochemical capacitor 37.

The control circuit 9 according to the invention comprises a ballast transistor 38 of the NPN type whose collector is connected via a current-limiting resistor 39 to the positive conductor 7, whilst the emitter is connected via a resistor 40 to the emitter of a transistor 41 of the PNP type. A ballast resistor 42 is arranged between the collector and emitter of the transistor 38, while the collector of the transistor 41, which is connected to the negative conductor 8 through a capacitor 43, is connected to one end of a primary winding 44 of the transformer 34, the other end being connected to the collector of the driver transistor 14.

A series of resistors 45, 46 and 47 is arranged between the conductors 7 and 8, the bases of transistors 38 and 41 being connected respectively to the common point of resistors 45 and 46 on the one hand and of resistors 46 and 47 on the other hand. The base of transistor 38 is connected at one side to the cathode of a Zener diode 48, whose anode is connected to the negative conductor 8, said Zener diode being shunted by an electrochemical capacitor 49.

Leaving the presence of the control circuit 9 according to the invention out of consideration, the operation of the switched-mode power supply is well known: the transistor 22 being alternatingly in the conductive and the blocking state, the energy stored in the magnetic circuit of the transformer 20 during the passage of current in the winding 21 is restituted during the blocking periods by means of the secondary windings 23, 24 and 25, in the form of a periodical voltage which is rectified by the diodes 27, 28 and 29 to supply the terminals 30, 31 and 32 with direct voltages which, after having been smoothed (not shown) supply the various circuits of the television set with power.

Assuming that the primary winding 44 of the transformer 34 is directly connected to the conductor 7 via a resistor instead of being connected to the control circuit 9 of the invention, said primary winding stores the energy during the conduction of the driver transistor 14 and, thereafter supplies it, during blocking, to the secondary winding 33 with such a polarity that the transistor 22 is brought into saturation; this mode of operation is called "non-simultaneous", the transistor 22 being blocked during the period the transistor 14 is conductive and conversely. The voltage regulation is effected by acting upon the duty cycle of the transistor 14, i.e. the ratio of its conduction time to its cut-off time, by means of a feedback loop, which via circuit 15 compares a direct control voltage supplied by the winding 19 to the direct reference voltage 16. The regulating voltage supplied by the comparator 15 modulates via circuit 13 the duration of the drive pulses of the transistor 14: when the control voltage tends to decrease, either due to an increase in power during usage, or owing to a mains voltage drop, the blocking time of the transistor 14 gets longer, which increases the conduction time of the transistor 22, and consequently the energy stored by the transformer 20 increases and conversely. The modulator 13 is controlled by signals which recur at a frequency of approximately 18 KHz supplied by the sawtooth oscillator 11 and shaped by the circuit 12.

If the mains voltage variations are comprised within the normal limits of ± 10% of the nominal value, the known circuit as described above functions perfectly. If, on the other hand it is desired that the power supply operates on mains supplies whose nominal voltage varies, for example, from 110 to 220 volts a switch-over action must be provided, either by means of a transformer having taps, or by changing from a bridge rectification of 220 volts to a voltage doubler rectification of 110 volts.

Figure 2:
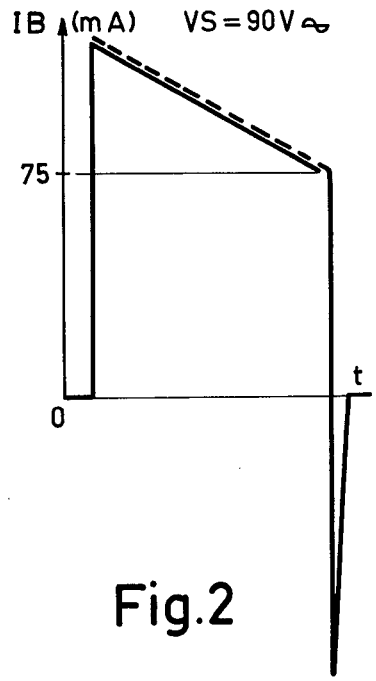
FIG. 2 shows an oscillogram of the base current of the switching transistor of the diagram of FIG. 1 when the mains voltage is 90 volts.

When the control circuit 9 is put into use, such a switch-over can be dispensed with: the zener diode 48 keeps the base voltage of the ballast transistor 38 constant, the emitter voltage of the latter is substantially fixed whatever the value of the mains voltage applied to terminals 1 and 2. For the lowest mains voltage, for example 90 volts, the ratio between the bias resistors 46 and 47 of the base of the transistor 41 as well as the value of the resistor 40 are chosen such that said transistor is in the saturated state whilst, due to the alternating conductive state of the transistors 22 and 14 the conduction time of the latter is at its minimum, which results in a low value of the average current. In these circumstances the voltage drop in the resistor 40 is minimal and the transistor 41 is saturated. The base current IB of the switching transistor 22, for example of the Philips type BU 126, then has the form indicated by a solid line in FIG. 2, whilst the dashed line shows substantially the same current value in the absence of circuit 9; at the start the base current shows a high peak value destined for a very quick saturation of the transistor 22, thereafter as the capacitor 37 is charged the current decreases linearly to a value which is sufficiently low, (for example 75 mA) to avoid the disturbing effect of stored charges; at the moment blocking occurs the latter is strengthened by the base current peak produced by the discharge of the capacitor 37.

Figure 3:
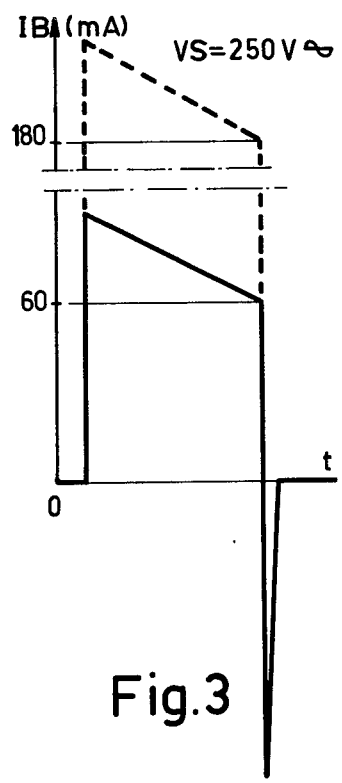
FIG. 3 shows an oscillogram of the same base current when the mains voltage is 250 volts.

When the mains power increases the conduction time and consequently the average current of the transistor 14 increase, as does the voltage drop in the resistor 40; the transistor 41 passes to the linear state, thus limiting the current flowing through the winding 44 of the transformer 34. At the maximum mains voltage, for example 250 volts, the base current of the switching transistor 22 has the form shown in solid lines in FIG. 3, the value of said current at the moment of blocking being 60 mA; the broken lines show the form of the current in the absence of circuit 9, which results in a current value of 180 mA at the blocking moment, which results in a prohibitive lengthening of the turn-off time due to the great quantity of stored charges.

It may be remarked that the value of the base current at the blocking moment is lower (60 mA, FIG. 3) at the maximum mains power than the value (75 mA, FIG. 2) at the minimum power supply; this "over compensation" has the object of taking the peak current variation of the collector IC of the transistor 22 into account which is in the first case 800 mA and 950 mA in the second case. In this manner a ratio (IC/IB) which is substantially constant is maintained which is favorable for the maximum switching speed.

In known manner the capacitor 43 regulates the average current of the transistor 14 by restituting, during the conduction period of the latter the energy which it has stored during the blocking periods.

In the above explanation the transistors 14 and 22 operate in the non-simultaneous mode. For a simultaneous mode operation it is sufficient to so adjust the elements of the circuit 9 that the transistor 41 is in the saturated state at the highest mains voltage, for example 250 volts, which then corresponds with the average minimum current supplied by said transistor. In these conditions the decrease in the mains voltage results in the increase of the average current which causes the transistor 41 to be brought out of saturation. So the process of compensation is performed in exactly the same way as in the non-simultaneous mode of operation.

What is claimed is:

1. A control circuit for a switched-mode power supply, said power supply comprising a non-regulated rectified DC voltage source, a driver transistor, a first transformer having primary and secondary windings, an end of said primary being coupled to the collector-emitter path of said driver transistor, a switching transistor having a base coupled to said secondary, a second transformer having a primary winding coupled in series with said switching transistor, and a plurality of secondary windings, said control circuit comprising a first additional transistor having a collector coupled to the remaining end of the primary winding of the first transformer not connected to the driver-transistor and an emitter coupled to the non-regulated direct voltage source.

2. A control circuit as claimed in claim 1, further comprising a constant voltage source coupled to the base of the additional transistor.

3. A control circuit as claimed in claim 1, further comprising a constant current source, and a resistor coupled between the emitter of the additional transistor and the constant current source.

4. A control circuit as claimed in claim 3, wherein the constant current source comprises a second additional transistor, the two additional transistors being of complementary conductivity and their emitters being connected with each other through said resistor, the collector of the second additional transistor being coupled to the non-regulated rectified direct voltage source and the collector of the first additional transistor being coupled to the end of the primary winding of the first transformer not connected to the driver transistor.

5. A control circuit as claimed in claim 4, further comprising a resistor coupled in series with the collector circuit of said second additional transistor and the non-regulated rectified direct voltage source.

6. A control circuit as claimed in claim 5, further comprising a zener diode coupled between the base of the second additional transistor and the non-regulated voltage source.

7. A control circuit as claimed in claim 6, further comprising a resistance bridge coupled to the base of the first additional transistor and arranged between the two electrodes of the zener diode.

8. A control circuit as claimed in claim 7, wherein the driver transistor and the switching transistor do not conduct simultaneously, and the voltage between the two electrodes of the zener diode as well as the values of the resistors arranged between the said electrodes and of the resistor arranged between the emitters of the two additional transistors are chosen so that the first additional transistor is in the saturated state at the lowest value of the non-regulated voltage while it operates in the linear state at a higher value of said non-regulated voltage.

* * * * *